United States Patent
Liou et al.

(10) Patent No.: US 6,322,224 B1
(45) Date of Patent: Nov. 27, 2001

(54) LAMPSHADE FOR SCANNER

(76) Inventors: Kenneth Liou; Ting-Hao Hsiao, both of 9F, 108-3 Min-Chuan Rd., Hsin-Tian, Taipei Hsien (TW)

(*) Notice: Subject to any disclaimer, the term of this patent is extended or adjusted under 35 U.S.C. 154(b) by 0 days.

(21) Appl. No.: 09/501,227

(22) Filed: Feb. 10, 2000

(51) Int. Cl.[7] .................................................. G01D 11/28
(52) U.S. Cl. ............................ 362/23; 362/241; 362/247; 362/85
(58) Field of Search .................................. 362/241, 247, 362/248, 85, 249, 23

(56) References Cited

U.S. PATENT DOCUMENTS 4,254,453 * 3/1981 Mouyard et al. ..................... 362/246

* cited by examiner

Primary Examiner—Sandra O'Shea
Assistant Examiner—John Anthony Ward
(74) Attorney, Agent, or Firm—Rabin & Berdo, P.C.

(57) ABSTRACT

The present invention relates to a lampshade for scanner primarily comprising an inner lampshade disposed between a base board with a plurality of light sources and a light-condensing bar, wherein the inner lampshade has a bottom plate on which a plurality of through holes corresponding to the positions of each light sources on the base board are disposed, and wherein a plurality of protruding walls are respectively provided in front of two sides of each through hole (near the light-condensing bar) while a plurality of grooves with reflective surface corresponding to the positions of each through holes are created between every two protruding walls so that the light beams reach the light-condensing bar 30 after light-concentration of the inner lampshade 10, and the light beams with doubled luminous intensity as much as that of the prior art can be achieved; the outer lampshade is disposed at outside of the above-mentioned components, wherein the outer lampshade has a light-condensing cover with an arched reflective face at the inner sides of the upper and the lower walls thereof and respectively corresponding to the beam-emitting light-condensing bar so that the intensity of light can be doubled and the scanning distance of the scanner in accordance with the present invention can reach one meter.

6 Claims, 5 Drawing Sheets

LAMPSHADE FOR SCANNER

BACKGROUND OF THE INVENTION

1. Field of the Invention

The present invention relates to a lampshade for a scanner, and more particularly, to an improvement of the lampshade for a scanner with better luminous intensity within a range of one meter. An inner lampshade is disposed between light sources and a light-condensing bar while an arched slot respectively corresponding to each light source is created on the inner lampshade so that the light beams are effectively concentrated first and then emitted through the light-condensing bar to create double luminous intensity. Moreover, an outer lampshade is mounted in front of the above-mentioned components while an arched light-condensing cover corresponding to the light-condensing bar is respectively created at the inner side of the upper and the lower wall of the outer lampshade so that a quadruple intensity of light can be obtained in cooperation with the inner lampshade. Accordingly, the present invention is not only very convenient and correct in scanning, but also the scanning effect is very clear.

2. Description of the Prior Art

The conventional scanner is a device in which effective beams are emitted from the inner side of the main unit and shine on the identified objects. Thereafter, the light beams are reflected into the main unit for analysis and the results will be displayed on the monitor of the computer or the cash register. The scanner used for scanning the bar coded identification number of commodities on the common commercial counter is designed in a light-weight model so that better light sources are necessary for correct scanning. The principle of the prior art is shown in FIG. 5 that light beams are emitted from the inner side of the main unit and shine on the identified objects 50 or over that. Thereafter one part of the effective light beams are reflected back into the inner side of the main unit, then pass through a reflector (not shown), a beam-receiving lens assembly 51 and a receiving identifier 52 respectively, and are finally sent through signal cable to the monitor of the computer or the cash register in order to rapidly and correctly display the data of the commodities on the bar code. Thus, the present invention is the product with strong scanning function.

The scanning beams of the conventional scanner are insufficient so that the scanning distance and range are not long and broad enough; therefore, the application is unpractical, even the scanning quality is much influenced, that is, the scanner has to be operated for short range. When the scanner is hold a little farther, then the scanning effect is bad or even fails.

SUMMARY OF THE INVENTION

It is therefore a primary object of the present invention to provide a lampshade for a scanner with quadruple intensity of light as compared to the prior art, which comprises an inner lampshade between a base board with light sources and a light-condensing bar, wherein a plurality of through holes respectively corresponding to the light sources of the base board are disposed on a bottom plate. And a plurality of protruding walls are respectively created at two sides in front of the through holes while grooves corresponding to the through holes are provided between every two protruding walls. Therefore, the light beam reaches on the light-condensing bar after light-concentration of the inner lampshade and then the luminous intensity of the light beams with doubled as much as that of the prior art; accordingly, the objects at a greater scanning distance can be successfully scanned.

It is another object of the present invention to provide a lampshade for scanner which includes an outer lampshade, and both a light-condensing bar and a base board are disposed directly behind the outer lampshade, wherein the inner sides of an upper and a lower wall board of the outer lampshade corresponding to the light-condensing bar are respectively provided with an arched light-condensing cover so that the intensity of light can be doubled.

BRIEF DESCRIPTION OF THE DRAWINGS

The accomplishment of the above-mentioned objects of the present invention will become apparent from the following description and its accompanying drawings of which.

DETAILED DESCRIPTION OF THE PREFERRED EMBODIMENT

Figure 1:
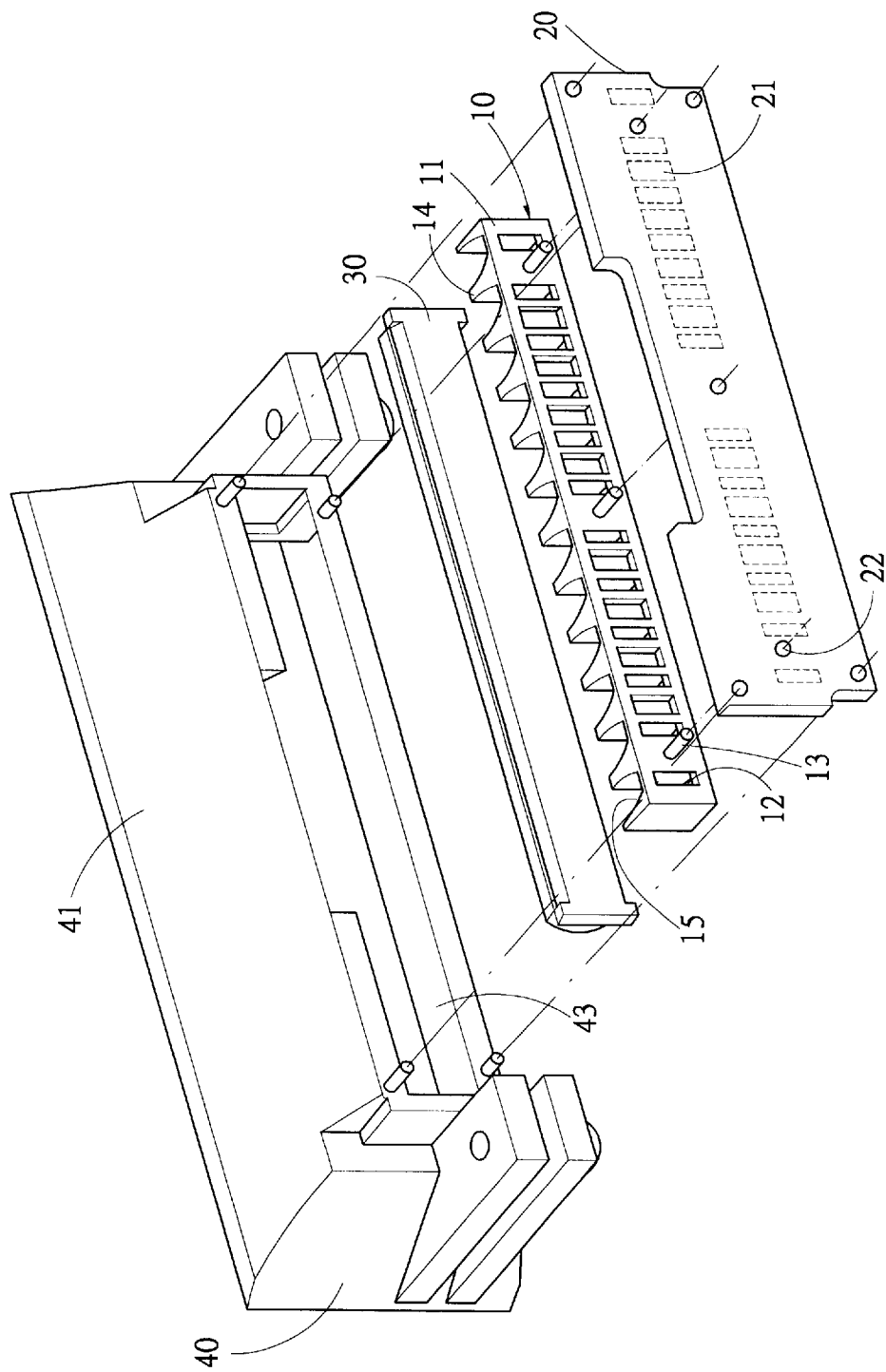
FIG. 1 is a perspective exploded view of the present invention.
Figure 2:
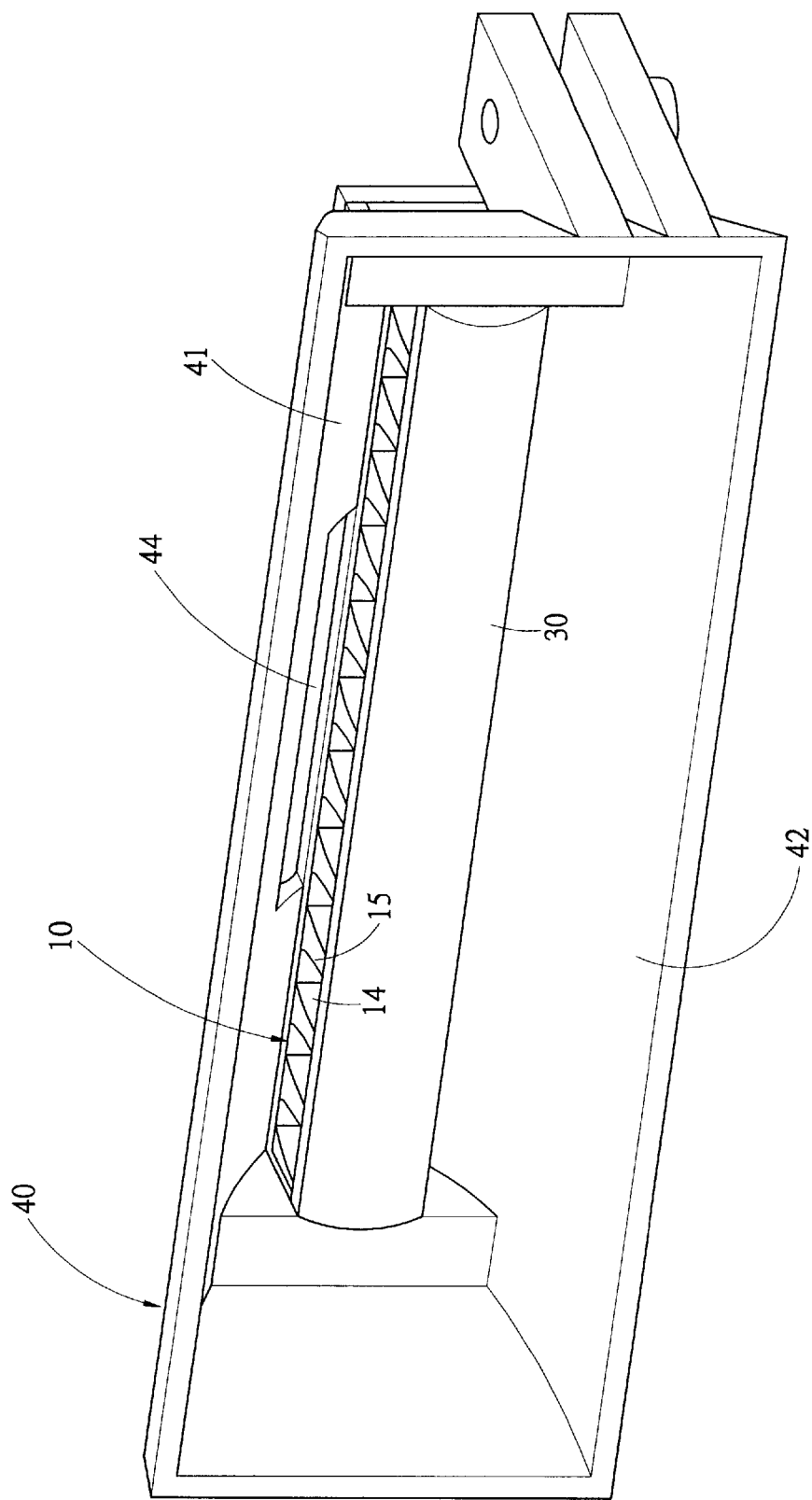
FIG. 2 is a perspective assembly view of an embodiment of the present invention.

First of all, referring to FIGS. 1 and 2, a lampshade for a scanner in accordance with the present invention primarily includes an inner lampshade 10 disposed between a base board 20 with a plurality of light sources 21 and a light-condensing bar 30. The base board 20 is provided with a plurality of equidistant light sources 21 in front thereof while a plurality of plug-in holes 22 are disposed on the surface of the The inner lampshade 10 has a bottom plate 11 on which a plurality of through holes 12 corresponding to the positions of each light sources 21 on the base board 20 are disposed. A plurality of protruding walls 14 are respectively provided in front of two sides of each through hole 12 (near the light-condensing bar 30) thus formed a plurality of grooves 15 with reflective surface corresponding to the positions of each through holes 12 which are created between every two protruding walls 14. The reflective surface of the grooves 15 is vertical to the horizontal axis of the light-condensing bar 30 so that the light emitted from the light sources 21 passes through the through holes 12 and reaches on the light-condensing bar 30 by means of the reflection and light-concentration of the grooves 15. In addition, the bottom plate 11 of the inner lampshade 10 includes a plurality of plugs 13 thereon which can be inserted into the corresponding plug-in holes 22 of the base board 20 for connecting the both.

Figure 3:
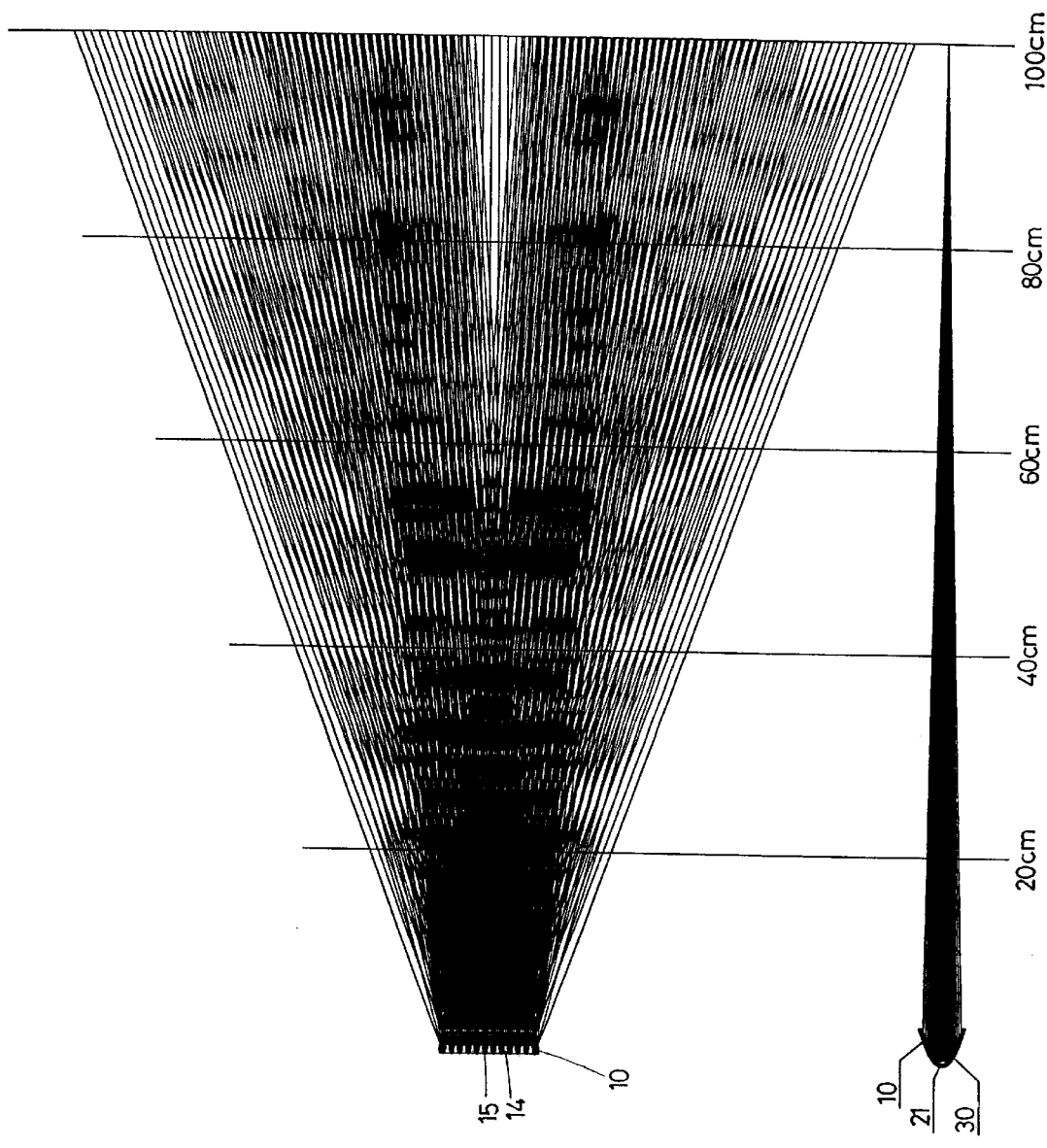
FIG. 3A is a top view of an inner lampshade of the present invention, illustrating the action thereof.
FIG. 3B is a side view of an inner lampshade of the present invention, illustrating the action thereof.

Referring to FIGS. 1 and 3, the light beams emitted from the through holes 12 and the grooves 15 of the inner lampshade 10 and located in front of the inner lampshade 10 can be intensified by means of the light-condensing and reflection while several laterally arranged light beams are focused to be a linear light beam so that the luminous intensity and the effective range of the present invention can be increased and the scanning distance can be extended by means of the light-condensing bar 30.

Figure 4:
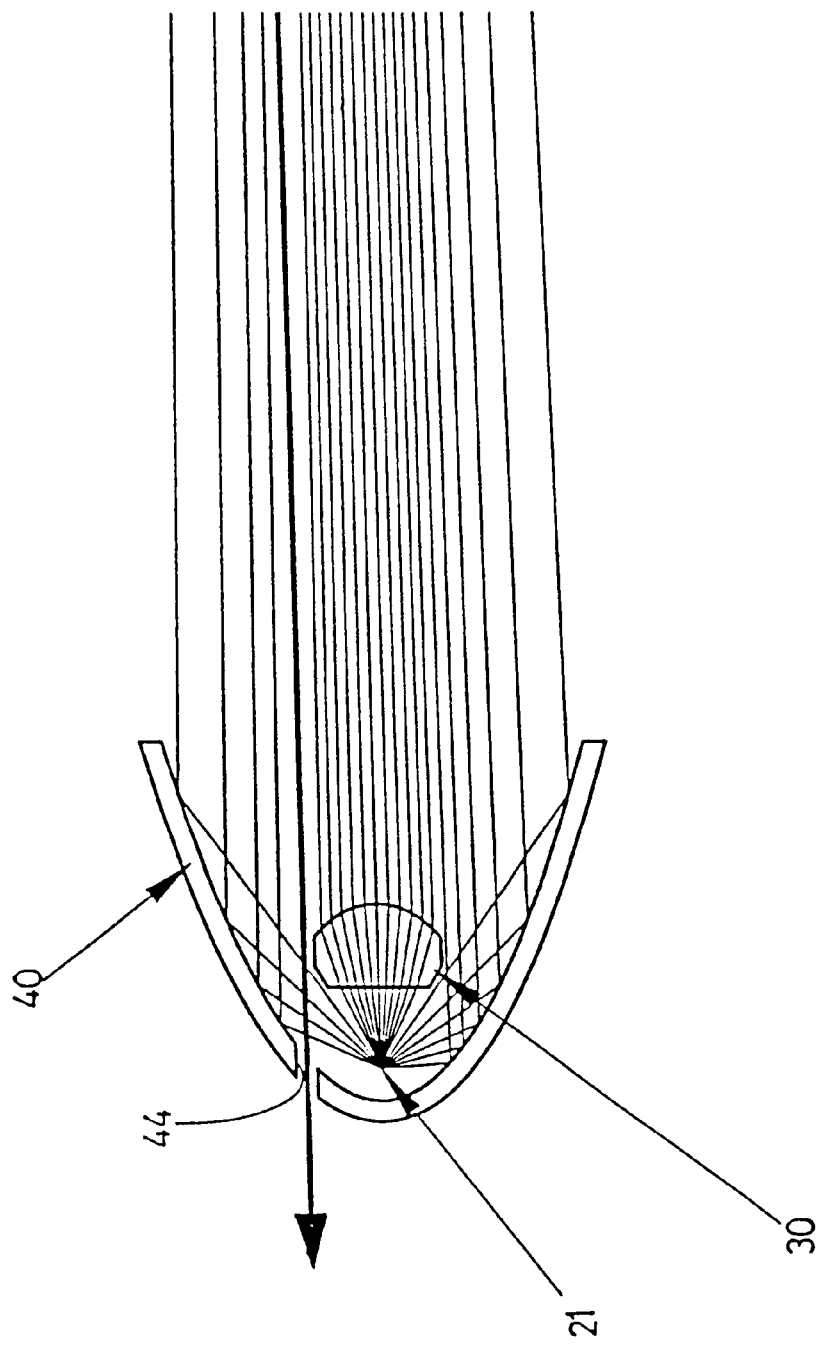
FIG. 4 is a schematic drawing of an embodiment of an outer lampshade and a light-condensing bar.
Figure 5:
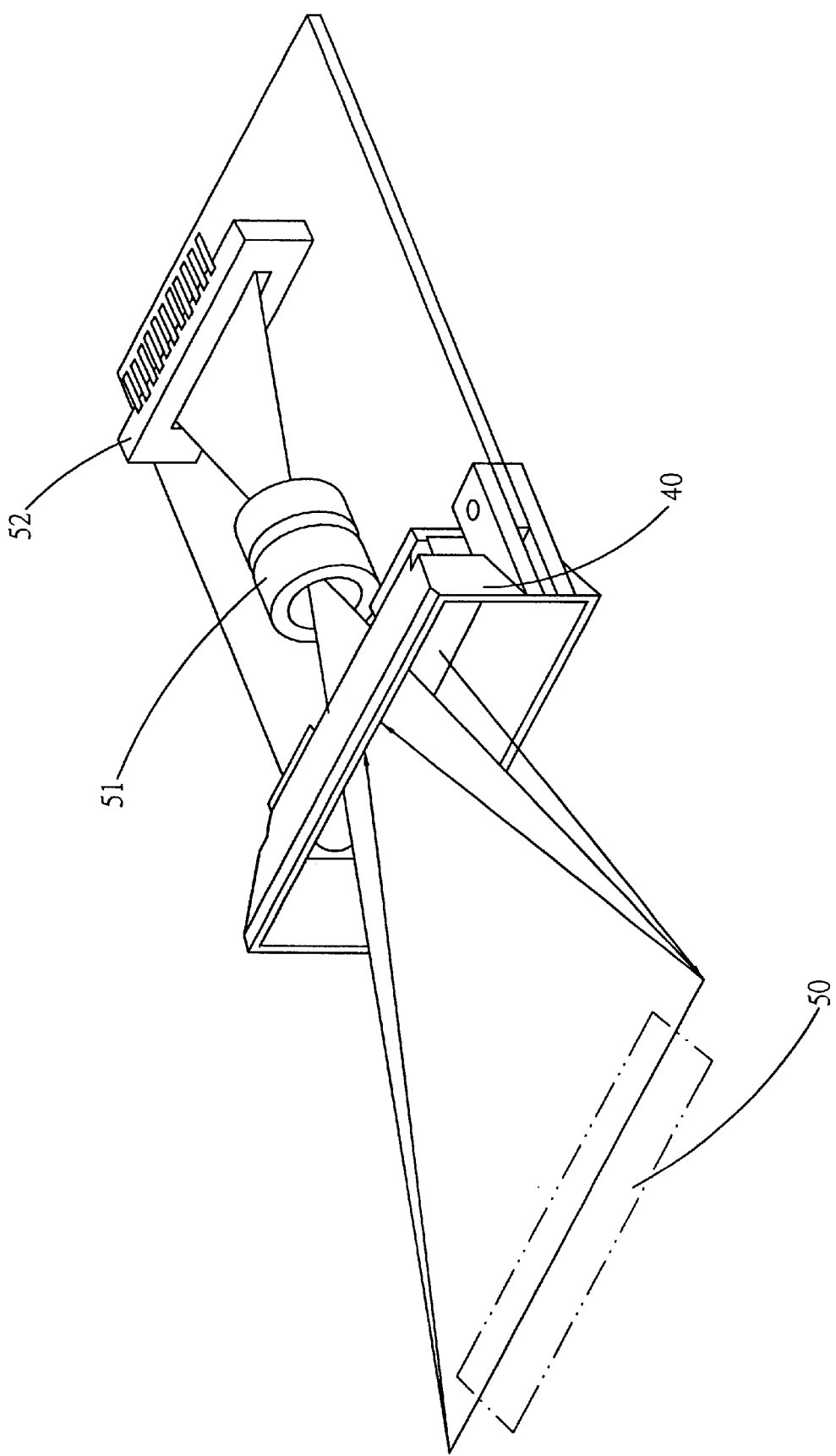
FIG. 5 is a schematic drawing of the arrangement and the structure of the embodiment of the present invention.

Referring to FIGS. 1, 2 and 4, the outer lampshade 40 is a four-sided enclosed cover, and the rear end thereof is provided with a long hole 43 to accommodate the light-condensing bar 30 and the inner lampshade 10, and the long hole 43 is spreading-shaped toward the wall of the front end thereof, wherein the outer lampshade 40 has a light-condensing cover with an arched reflective face at the inner sides of the upper and the lower walls 41, 42 thereof and respectively corresponding to the beam-emitting light-condensing bar 30, and the reflective face is parallel to the axis of the light-condensing bar 30. Moreover, the upper wall board 41 is provided with a beam-receiving hole 44. As shown in FIG. 4, after passing through the upper and the lower walls 41, 42 of the outer lampshade 40, the light beams are effectively collected at the middle section in front thereof so that the light beams within certain scanning range can be doubled. And the light beams pass over the identified object 50, as shown in FIG. 5. After the reflective beams enters from the beam-receiving hole 44 into a lens assembly 51 and a receiving identifier 52 behind the outer lampshade 40, the beams are transmitted by means of signal cable to the monitor of the computer or the cash register. The effective luminous range of the present invention can reach one meter in cooperation of the arrangement of the inner lampshade 10 and the outer lampshade 40.

By means of the excellent design of the present invention, it has the following advantages when used:

1. The present invention comprises the inner lampshade 10 which includes a plurality of through holes 12 and a plurality of protruding walls 14 at two sides of each through hole 12 while grooves 15 corresponding to each through holes 12 are created between every two protruding walls 14 so that the light beams reach the light-condensing bar 30 after light-concentration of the inner lampshade 10, and the light beams with doubled luminous intensity as much as that of the prior art can be achieved; accordingly, the objects at a greater scanning distance can be successfully scanned.

2. The present invention includes the outer lampshade 40, and the light-condensing bar 30 and the base board 20 are disposed directly behind the outer lampshade 40, wherein the outer lampshade 40 has a light-condensing cover with an arched reflective face at the inner sides of the upper and the lower walls 41, 42 thereof and respectively corresponding to the beam-emitting light-condensing bar 30 so that the intensity of light can be doubled.

3. The intensity of light beams of the conventional light sources 21 can be quadrupled in cooperation of the inner lampshade 10 and the outer lampshade 40 in accordance with the present invention so that the scanning distance of the scanner in accordance with the present invention can reach one meter long.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A lampshade for a scanner, comprising:

a base board having a plurality of light sources in an inner side thereof;

a light condensing bar in front of said base board and having a horizontal axis defining a direction in which said light-condensing bar extends; and an inner lampshade disposed between said base board and said light-condensing bar, said inner lampshade having a bottom plate having a plurality of through holes therein, each corresponding to a respective light source on said base board, said inner lampshade further having a plurality of protruding walls arranged so that two protruding walls are provided adjacent to each through hole with one protruding wall being disposed at a respective one of two sides of each through hole and another respective protruding wall being disposed at a respective another one of the two sides of each through hole, each said two protruding walls defining an inwardly-arched reflective groove corresponding to each through hole, each said protruding wall having a reflective face that is vertical to the axis of said light-condensing bar.

2. The lampshade for a scanner as recited in claim 1, further comprising an outer lampshade having four sides defining a long hole extending from a rear end of said outer lampshade to a front end of said outer lampshade, said light-condensing bar and said inner lampshade being accommodated within the long hole in a region of the rear end, the long hole becoming wider toward the front end of said outer lampshade, one of said four sides being an upper wall of said outer lampshade and another one of said four sides being a lower wall of said outer lampshade, said upper wall and said lower wall each having an arched reflective surface with a light-condensing effect, said reflective surfaces being parallel to the axis of said light-condensing bar.

3. The lampshade for a scanner as recited in claim 1, wherein each groove extends in a vertical direction.

4. The lampshade for a scanner as recited in claim 1, wherein only two walls are disposed adjacent to each through hole, said two walls being separated from each other.

5. The lampshade for a scanner as recited in claim 2, wherein said upper wall has a beam receiving hole formed therein, and disposed over said light-condensing bar and said inner lampshade.

6. The lampshade for a scanner as recited in claim 5, wherein said beam receiving hole receives light reflected after being transmitted through said light-condensing bar.

* * * * *